(12) United States Patent
Hang et al.

(10) Patent No.: US 11,101,866 B2
(45) Date of Patent: Aug. 24, 2021

(54) RANK INDICATION REPORTING METHOD AND APPARATUS, AND INDICATION METHOD AND APPARATUS

(71) Applicant: HUAWEI TECHNOLOGIES CO., LTD., Guangdong (CN)

(72) Inventors: Haicun Hang, Shanghai (CN); Xiaoyan Bi, Shanghai (CN); Ye Wu, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 2 days.

(21) Appl. No.: 16/694,405

(22) Filed: Nov. 25, 2019

(65) Prior Publication Data

US 2020/0091977 A1   Mar. 19, 2020

Related U.S. Application Data

(63) Continuation of application No. PCT/CN2018/089625, filed on Jun. 1, 2018.

(30) Foreign Application Priority Data

| Jun. 26, 2017 | (CN) | 201710497771.X |
| Aug. 11, 2017 | (CN) | 201710690656.4 |
| Aug. 31, 2017 | (CN) | 201710776700.3 |

(51) Int. Cl.
*H04B 7/06* (2006.01)
*H04B 7/0456* (2017.01)
(Continued)

(52) U.S. Cl.
CPC ........... *H04B 7/063* (2013.01); *H04B 7/0486* (2013.01); *H04B 7/0632* (2013.01); *H04L 1/0026* (2013.01); *H04W 24/10* (2013.01)

(58) Field of Classification Search
CPC .................................................. H04B 7/0621
See application file for complete search history.

(56) References Cited

U.S. PATENT DOCUMENTS

| 2013/0114656 A1 | 5/2013 | Sayana et al. |
| 2015/0215018 A1* | 7/2015 | Xiong .................. H04W 72/06 370/329 |

(Continued)

FOREIGN PATENT DOCUMENTS

| CN | 102714527 A | 10/2012 |
| CN | 103391154 A | 11/2013 |

(Continued)

OTHER PUBLICATIONS

3GPP TS 36.212 V14.3.0 (Jun. 2017), "3rd Generation Partnership Project; Technical Specification Group Radio Access Network; Evolved Universal Terrestrial Radio Access (E-UTRA); Multiplexing and channel coding (Release 14)," Jun. 2017, 198 pages.

(Continued)

*Primary Examiner* — Ayanah S George
(74) *Attorney, Agent, or Firm* — Fish & Richardson P.C.

(57) ABSTRACT

Embodiments of this application disclose a rank indication reporting method and apparatus, and an indication method and apparatus, and relate to the field of communications technologies. The method may include: receiving at least two pieces of indication information, where each of the at least two pieces of indication information is used to indicate a maximum value of an RI that a network device associated with the indication information allows a terminal to report, and at least two network devices associated with the at least two pieces of indication information cooperate to provide a service for the terminal; and reporting RIs based on the at least two pieces of indication information.

13 Claims, 5 Drawing Sheets

(51) Int. Cl.
*H04L 1/00* (2006.01)
*H04W 24/10* (2009.01)

(56) References Cited

U.S. PATENT DOCUMENTS

2018/0070351 A1   3/2018  Ko et al.
2018/0132227 A1*  5/2018  Ghosh .................. H04L 5/0035

FOREIGN PATENT DOCUMENTS

| | | |
|---|---|---|
| CN | 103918195 A | 7/2014 |
| EP | 2642812 B1 | 12/2016 |
| WO | 2014129843 A1 | 8/2014 |

OTHER PUBLICATIONS

Extended European Search Report issued in European Application No. 18824372.9 dated Mar. 18, 2020, 8 pages.
PCT International Search Report and Written Opinion issued in International Application No. PCT/CN2018/089625 dated Aug. 23, 2018, 19 pages (with English translation).

* cited by examiner

RANK INDICATION REPORTING METHOD AND APPARATUS, AND INDICATION METHOD AND APPARATUS

CROSS-REFERENCE TO RELATED APPLICATIONS

This application is a continuation of International Application No. PCT/CN2018/089625, filed on Jun. 1, 2018, which claims priority to Chinese Patent Application No. 201710776700.3, filed on Aug. 31, 2017, Chinese Patent Application No. 201710690656.4, filed on Aug. 11, 2017, and Chinese Patent Application No. 201710497771.X, filed on Jun. 26, 2017. All of the aforementioned patent applications are hereby incorporated by reference in their entireties.

TECHNICAL FIELD

This application relates to the field of communications technologies, and in particular, to a rank indication (RI) reporting method and apparatus, and an indication method and apparatus.

BACKGROUND

A 5G communications system has higher requirements in a plurality of aspects such as a system capacity, an instantaneous peak rate, spectral efficiency, a cell edge user throughput, and a latency. A coordinated multipoint technology can improve system performance on both an uplink and a downlink, and particularly, improve spectral efficiency of a cell edge. Therefore, the coordinated multipoint (CoMP) technology is introduced to the 5G communications system. However, the 5G communications system is currently in a research and development design phase. After the coordinated multipoint technology is introduced, a related design of an RI is not yet determined.

SUMMARY

This application provides an RI reporting method and apparatus, and an indication method and apparatus. Specifically, a related design of an RI after a coordinated multipoint technology is introduced is provided.

According to a first aspect, this application provides an RI reporting method and apparatus.

In a possible design, the method may include: receiving at least two pieces of indication information, where each piece of indication information is used to indicate a maximum value of an RI that a network device associated with the indication information allows a terminal to report, and at least two network devices associated with the at least two pieces of indication information cooperate to provide a service for the terminal; and reporting RIs based on the at least two pieces of indication information. The method may be performed by the terminal. In this technical solution, the indication information received by the terminal is used to indicate the maximum value of the RI that the network device associated with the indication information allows the terminal to report, in other words, a network side configures a maximum value of an RI that a network device allows the terminal to report, to help implement a case in which a sum of RIs that network devices cooperating to provide a service for the terminal allow the terminal to report is less than or equal to a maximum quantity of transmission layers that is supported by the terminal. This helps ensure that when the network devices cooperating to provide a service for the terminal simultaneously schedule the terminal, a total quantity of scheduled layers does not exceed a decoding capability of the terminal.

Correspondingly, this application provides an RI reporting apparatus, and the apparatus can implement the RI reporting method according to the first aspect. For example, the apparatus may be a terminal, and can implement the foregoing method by using software or hardware or by using hardware executing corresponding software.

In a possible design, the apparatus may include a processor and a memory. The processor is configured to support the apparatus in executing corresponding functions in the method according to the first aspect. The memory is configured to be coupled to the processor, and stores a program (instruction) and data necessary for the apparatus. In addition, the apparatus may further include a communications interface, to support communication between the apparatus and another network element. The communications interface may be a transceiver.

In a possible design, the apparatus may include a transceiver unit. The transceiver unit is configured to receive at least two pieces of indication information, and report an RI based on the at least two pieces of indication information. Each piece of indication information is used to indicate a maximum value of an RI that a network device associated with the indication information allows a terminal to report, and at least two network devices associated with the at least two pieces of indication information cooperate to provide a service for the terminal.

Based on either the method or the apparatus according to the first aspect, in a possible design, a sum of maximum values of RIs that the at least two network devices allow the terminal to report is less than or equal to a maximum quantity of transmission layers that is supported by the terminal. This can ensure that when network devices cooperating to provide a service for the terminal simultaneously schedule the terminal, a total quantity of scheduled layers does not exceed the decoding capability of the terminal. The decoding capability of the terminal may be represented by using, for example, but not limited to, the maximum quantity of transmission layers that is supported by the terminal.

Based on either the method or the apparatus according to the first aspect, in a possible design, the at least two pieces of indication information are received within a same measurement period. The possible design provides a technical solution in which indication information is sent in a periodic manner, and limits the at least two pieces of indication information. This application is not limited thereto.

Based on either the method or the apparatus according to the first aspect, in a possible design, the at least two pieces of indication information comes from a same network device in the at least two network devices, and the network device may be any one of the network devices that cooperate to provide a service for the terminal. Alternatively, each piece of indication information comes from a network device associated with the indication information. Certainly, this application is not limited thereto. For example, but no limitation is imposed on the following description: some of the at least two pieces of indication information come from network devices associated with the indication information, and a plurality of pieces of other indication information comes from one or more network devices, where a plurality of pieces of indication information in the plurality of pieces of other indication information come from a same network device.

Based on either the method or the apparatus according to the first aspect, in a possible design, the indication information may be a new message, or a message in the prior art may be reused. Any one of the foregoing technical solutions may be applied to a scenario in which a PMI is fed back, or may be applied to a scenario in which no PMI is fed back. In the scenario in which the PMI is fed back, one example in which codebook subset restriction indication information is reused for the indication information is used.

According to a second aspect, this application provides an indication method and apparatus.

In a possible design, the method may include: generating at least two pieces of indication information, where each piece of indication information is used to indicate a maximum value of an RI that a network device associated with the indication information allows a terminal to report, and at least two network devices associated with the at least two pieces of indication information cooperate to provide a service for the terminal; and sending the at least two pieces of indication information. The method may be performed by a network device.

Correspondingly, this application provides an indication apparatus, and the apparatus can implement the indication method according to the second aspect. For example, the apparatus may be a network device, and can implement the foregoing method by using software or hardware or by using hardware executing corresponding software.

In a possible design, the apparatus may include a processor and a memory. The processor is configured to support the apparatus in executing corresponding functions in the method according to the second aspect. The memory is configured to be coupled to the processor, and stores a program (instruction) and data necessary for the apparatus. In addition, the apparatus may further include a communications interface, to support communication between the apparatus and another network element. The communications interface may be a transceiver.

In a possible design, the apparatus may include a processing unit and a transceiver unit. The processing unit is configured to generate at least two pieces of indication information, where each piece of indication information is used to indicate a maximum value of an RI that a network device associated with the indication information allows a terminal to report, and at least two network devices associated with the at least two pieces of indication information cooperate to provide a service for the terminal. The transceiver unit is configured to send the at least two pieces of indication information.

Based on either the method or the apparatus according to the second aspect, in a possible design, a sum of maximum values of RIs that the at least two network devices allow the terminal to report is less than or equal to a maximum quantity of transmission layers that is supported by the terminal.

According to a third aspect, this application provides an indication method and apparatus.

In a possible design, the method may include: generating indication information, where the indication information is used to indicate a maximum value of an RI that a network device associated with the indication information allows a terminal to report, and the network device cooperates with another network device to provide a service for the terminal; and sending the indication information. The method may be performed by a network device.

Correspondingly, this application provides an indication apparatus, and the apparatus can implement the indication method according to the third aspect. For example, the apparatus may be a network device, and can implement the foregoing method by using software or hardware or by using hardware executing corresponding software.

In a possible design, the apparatus may include a processor and a memory. The processor is configured to support the apparatus in executing corresponding functions in the method according to the third aspect. The memory is configured to be coupled to the processor, and stores a program (instruction) and data necessary for the apparatus. In addition, the apparatus may further include a communications interface, to support communication between the apparatus and another network element. The communications interface may be a transceiver.

In a possible design, the apparatus may include a processing unit and a transceiver unit. The processing unit is configured to generate indication information, where the indication information is used to indicate a maximum value of an RI that a network device associated with the indication information allows a terminal to report, and the network device cooperates with another network device to provide a service for the terminal. The transceiver unit is configured to send the indication information.

Based on either the method or the apparatus according to the third aspect, in a possible design, a sum of maximum values of RIs that the network device and the another network device allow the terminal to report is less than or equal to a maximum quantity of transmission layers that is supported by the terminal.

Based on either the method or the apparatus according to the third aspect, in a possible design, the indication information is carried in any one of the following information: report setting information, reference signal setting information, measurement setting information, and connection relationship information.

Based on any one of the methods or the apparatuses according to any one of the foregoing aspects, in a possible design, the indication information is carried in any one of the following information: report setting information, reference signal setting information, measurement setting information, and connection relationship information.

According to a fourth aspect, this application provides an RI reporting method and apparatus.

In a possible design, the method may include: determining that at least two network devices cooperate to provide a service for a terminal; and reporting an RI associated with each network device, where a sum of RIs reported by the terminal is less than or equal to a maximum quantity of transmission layers that is supported by the terminal. The method may be performed by a terminal. In this technical solution, when the terminal determines that the at least two network devices cooperate to provide the service for the terminal, the sum of the RIs reported to the at least two network devices is less than or equal to the maximum quantity of transmission layers that is supported by the terminal. This helps ensure that when the at least two network devices simultaneously schedule the terminal, a total quantity of scheduled layers does not exceed a decoding capability of the terminal. The decoding capability of the terminal may be represented by using, for example, but not limited to, the maximum quantity of transmission layers that is supported by the terminal.

Correspondingly, this application provides an indication apparatus, and the apparatus can implement the RI reporting method according to the fourth aspect. For example, the apparatus may be a terminal, and can implement the foregoing method by using software or hardware or by using hardware executing corresponding software.

In a possible design, the apparatus may include a processor and a memory. The processor is configured to support the apparatus in executing corresponding functions in the method according to the fourth aspect. The memory is configured to be coupled to the processor, and stores a program (instruction) and data necessary for the apparatus. In addition, the apparatus may further include a communications interface, to support communication between the apparatus and another network element. The communications interface may be a transceiver.

In a possible design, the apparatus may include a processing unit and a transceiver unit. The processing unit is configured to determine that at least two network devices cooperate to provide a service for a terminal. The transceiver unit is configured to report an RI associated with each network device, where a sum of RIs reported by the terminal is less than or equal to a maximum quantity of transmission layers that is supported by the terminal. The method may be performed by a terminal.

Based on the method or the apparatus according to the fourth aspect, in a possible design, the determining that at least two network devices cooperate to provide a service for a terminal may include: if it is determined that a maximum quantity of pieces of downlink control information pointing to the terminal within a preset time period is N, determining that a maximum of N network devices cooperate to provide a service for the terminal, where N is an integer greater than or equal to 2.

According to a fifth aspect, this application provides an indication method and apparatus.

In a possible design, the method may include: generating indication information, where the indication information is used to indicate a maximum value of a sum of RIs that at least two devices cooperating to provide a service for a terminal allow the terminal to report; and sending the indication information. The method may be performed by a network device. In this technical solution, a network side configures the maximum value of the sum of the RIs that the at least two devices cooperating to provide the service for the terminal allow the terminal to report. This helps ensure that when network devices cooperating to provide a service for the terminal simultaneously schedule the terminal, a total quantity of scheduled layers does not exceed a decoding capability of the terminal, provided that the maximum value is limited within a maximum quantity of transmission layers that is supported by the terminal.

Correspondingly, this application provides an indication apparatus, and the apparatus can implement the indication method according to the fifth aspect. For example, the apparatus may be a network device, and can implement the foregoing method by using software or hardware or by using hardware executing corresponding software.

In a possible design, the apparatus may include a processor and a memory. The processor is configured to support the apparatus in executing corresponding functions in the method according to the fifth aspect. The memory is configured to be coupled to the processor, and stores a program (instruction) and data necessary for the apparatus. In addition, the apparatus may further include a communications interface, to support communication between the apparatus and another network element. The communications interface may be a transceiver.

In a possible design, the apparatus may include a processing unit and a transceiver unit. The processing unit is configured to generate indication information, where the indication information is used to indicate a maximum value of a sum of RIs that at least two devices cooperating to provide a service for a terminal allow the terminal to report. The transceiver unit is configured to send the indication information.

According to a sixth aspect, this application provides an RI reporting method and apparatus.

In a possible design, the method may include: receiving indication information, where the indication information is used to indicate a maximum value of a sum of RIs that at least two devices cooperating to provide a service for a terminal allow the terminal to report; and determining a value of a reported RI based on the indication information. Optionally, the method may further include: reporting the determined RI. The method may be performed by a terminal.

Correspondingly, this application provides an indication apparatus, and the apparatus can implement the RI reporting method according to the sixth aspect. For example, the apparatus may be a terminal, and can implement the foregoing method by using software or hardware or by using hardware executing corresponding software.

In a possible design, the apparatus may include a processor and a memory. The processor is configured to support the apparatus in executing corresponding functions in the method according to the sixth aspect. The memory is configured to be coupled to the processor, and stores a program (instruction) and data necessary for the apparatus. In addition, the apparatus may further include a communications interface, to support communication between the apparatus and another network element. The communications interface may be a transceiver.

In a possible design, the apparatus may include a transceiver unit and a processing unit. The transceiver unit is configured to receive indication information, where the indication information is used to indicate a maximum value of a sum of RIs that at least two devices cooperating to provide a service for a terminal allow the terminal to report. The processing unit is configured to determine a value of a reported RI based on the indication information. Optionally, the transceiver unit is further configured to report the RI determined by the processing unit.

Based on any manner according to the fifth aspect and sixth aspect, in a possible design, the maximum value of the sum of the RIs that the at least two network devices allow the terminal to report is less than or equal to a maximum quantity of transmission layers that is supported by the terminal. The maximum quantity of transmission layers that is supported by the terminal is less than or equal to a quantity of receive antenna ports of the terminal.

Based on any manner according to the fifth aspect and the sixth aspect, in a possible design, the indication information is carried in any one of the following information: report setting information, reference signal setting information, measurement setting information, and connection relationship information.

This application further provides a computer storage medium, where the computer storage medium stores a computer program (instruction), and when the program (instruction) runs on a computer, the computer performs the method according to any one of the foregoing aspects.

This application further provides a computer program product, where when the computer program product runs on a computer, the computer performs the method according to any one of the foregoing aspects.

It may be understood that any apparatus or computer storage medium or computer program product provided above is configured to perform the corresponding methods provided above. Therefore, for beneficial effects that can be achieved by the apparatus or computer storage medium or computer program product, refer to beneficial effects of the corresponding methods. Details are not described herein again.

DESCRIPTION OF EMBODIMENTS

The term "a plurality of" in this application means two or more than two. The term "and/or" in this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In this application, the terms "first", "second", and so on are intended to distinguish between different objects but do not limit an order of the objects.

The technical solutions provided in this application may be applied to various communications systems in which a coordinated multipoint technology is used, for example, an existing communications system in which the coordinated multipoint technology is used, a 5G communications system, a future evolved system, or a plurality of converged communications systems. There may be a plurality of application scenarios, for example, a scenario such as machine to machine (M2M), D2M, macro-micro communication, enhanced mobile broadband (eMBB), ultra-reliable and low-latency communications (uRLLC), and massive machine-type communications (mMTC). These scenarios may include but are not limited to a communication scenario between terminals, a communication scenario between network devices, a communication scenario between a network device and a terminal, and the like. The technical solutions provided in this application may also be applied to scenarios such as communication between terminals or communication between network devices in the 5G communications system.

Figure 1:
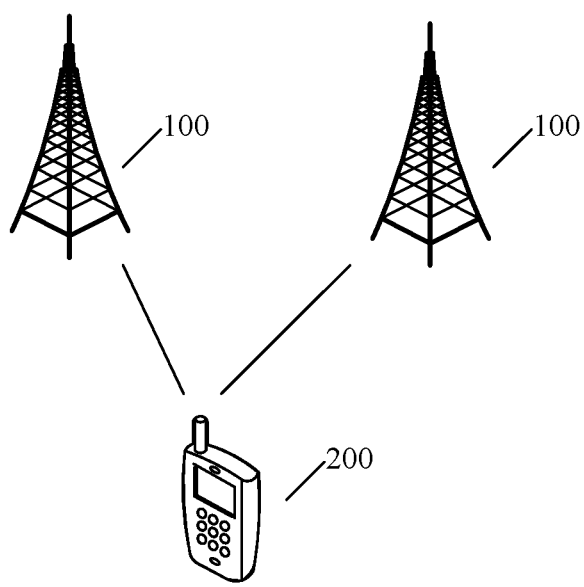
FIG. 1 is a schematic diagram of a communications system applicable to technical solutions according to an embodiment of this application.

FIG. 1 is a schematic diagram of a communications system applicable to the technical solutions provided in this application. The communications system may include a plurality of network devices 100 (only two network devices are shown) and one or more terminals 200 (only one terminal 200 is shown). At least two network devices 100 provide a service for one terminal 200 through cooperation. A same network device 200 may provide services for different terminals 200, and a same network device 200 or different network devices 200 may provide services for different terminals 200.

The network device 100 may be a device that can communicate with the terminal 200. The network device 100 may be a transmission reception point (TRP), a base station network device, a relay station, an access point, or the like. The network device 100 may be a base transceiver station (BTS) in a global system for mobile communications (GSM) or a code division multiple access (CDMA) network, or may be an NB (NodeB) in wideband code division multiple access (WCDMA), or may be an eNB or an eNodeB (evolutional NodeB) in LTE. Alternatively, the network device 100 may be a radio controller in a cloud radio access network (CRAN) scenario. Alternatively, the network device 100 may be a network device in a 5G communications system or a network device in a future evolved network, or may be a wearable device, a vehicle-mounted device, or the like.

The terminal 200 may be user equipment (UE), an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless phone, a session initiation protocol (SIP) phone, a wireless local loop (WLL) station, personal digital assistant (PDA), a handheld device having a wireless communication function, a computing device, another processing device connected to a wireless modem, a vehicle-mounted device, a wearable device, a terminal in a future 5G network, or a terminal in a future evolved PLMN network.

The following describes related technologies in this application for easy understanding of the reader.

Signal transmission depends on accuracy of channel state information (CSI). The CSI may include, for example, but is not limited to at least one of the following: a precoding indicator (precoding matrix index, PMI), an RI, and the like. In a communications system, for example, a long term evolution (LTE) system or an LTE-A (LTE-advanced) system, a network device first configures some measurement setting information. The measurement setting information may include reference signal (RS) setting (RS setting) information, report setting information, and the like. The reference signal setting information may include at least one of the following information: a quantity of ports for reference signals used for measurement, a port number of a reference signal, a sending time of a reference signal, a sending manner of a reference signal (for example, periodic or non-periodic sending), and the like. A reference signal used for measurement may be, for example, but not limited to, a channel CSI-RS, a demodulation reference signal (DMRS), and the like. The report setting information is mainly used to indicate specific CSI that a terminal needs to report and a manner of reporting the CSI (for example, periodic or non-periodic reporting, or reporting is performed by using a wideband or a subband). Then, the terminal reports the CSI to the network device based on the measurement setting information. When scheduling the terminal, the network device performs a specific adjustment based on the CSI reported by the terminal, to determine a total quantity of scheduled layers, used precoding, a used modulation and coding scheme (MCS), scheduled bandwidth, and the like when finally scheduling the terminal.

In an LTE system, the RI is defined as a quantity of transmission layers that is determined by the terminal. In a 5G communications system, the RI also needs to be reported. For details about a report process, refer to the previous description.

In the LTE system, each terminal may be provided with a service by using one network device, or by using a coordinated multipoint technology. In the coordinated multipoint technology, a network device sends corresponding measurement setting information to the terminal. Any network device may send measurement setting information related to the network device, or may send measurement setting information related to another network device. The terminal reports CSI based on the measurement setting information delivered by the network device. However, the coordinated multipoint technology in the LTE system is different from that in the 5G communications system. For example, when cooperating to provide a service for a terminal through non-coherent joint transmission (NCJT), the network devices may exchange information with each other in real time in the LTE system, but in the 5G communications system, the network devices cannot perform real-time interaction due to non-ideal backhaul, a network device does not send an id of the network device (for example, a TRP) to the terminal, and the terminal does not know a specific network device that sends measurement setting information, and does not care how the network device uses CSI reported by the terminal.

The following describes, by using an example, a technical problem caused after the coordinated multipoint technology is introduced to the 5G communications system. As shown in FIG. 1, two network devices (marked as a network device 1 and a network device 2) cooperate to provide a service for a terminal, and independently schedule the terminal. Assuming that each of the network device 1 and the network device 2 is equipped with 64 transmit antennas, and the terminal is equipped with eight receive antennas, a maximum of eight layers of data of the terminal can be scheduled. Both the transmit antenna and the receive antenna herein are physical antennas (namely, physical ports). According to a technical solution provided in the LTE system, because the terminal needs to report CSI to both the network device 1 and the network device 2, network devices (including the network device 1 and/or the network device 2) need to deliver a plurality of pieces of measurement setting information. It is assumed that measurement setting information 1 is for the network device 1 and the terminal, and measurement setting information 2 is for the network device 2 and the terminal. If only the measurement setting information is considered, a maximum value of an RI reported by the terminal to the network device 1 may be eight layers, and a maximum value of an RI reported to the network device 2 may also be eight layers. This exceeds a decoding capability of the terminal. The decoding capability of the terminal may be represented by using, for example, but not limited to, a maximum quantity of transmission layers that is supported by the terminal. It may be understood that the maximum quantity of transmission layers (namely, a quantity of streams) that is supported by the terminal is in a one-to-one correspondence with antenna ports. An antenna port is a logical concept, and is different from a physical port. The antenna port is related to the physical port through layer mapping and precoding. For details about a related process, refer to the prior art. Details are not described herein. The maximum quantity of transmission layers that is supported by the terminal is less than or equal to a quantity of receive antenna ports of the terminal.

Therefore, this application provides an RI reporting method and apparatus, and an indication method and apparatus. The following describes the technical solutions provided in this application with reference to the accompanying drawings.

Figure 2:
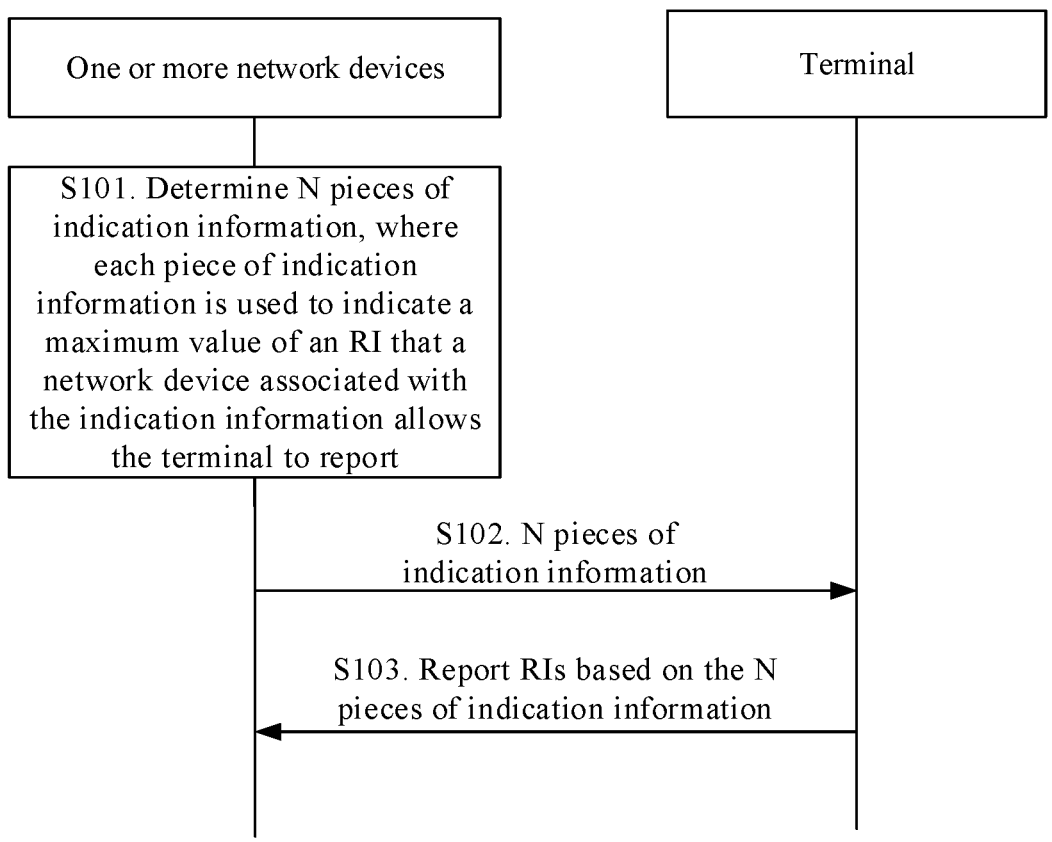
FIG. 2 is a schematic diagram of an indication method and an RI reporting method according to an embodiment of this application.

FIG. 2 is a schematic diagram of an indication method and an RI reporting method according to this application. The method is applicable to a scenario in which N network devices cooperate to provide a service for a same terminal, where N is an integer greater than or equal to 2. Details are as follows.

S101. M primary network devices in the N network devices determine N pieces of indication information, where $1 \leq M \leq N$, and M is an integer. Each piece of indication information is used to indicate a maximum value of an RI that a network device associated with the indication information allows a terminal to report, each piece of indication information is associated with one network device, and different pieces of indication information are associated with different network devices.

Each network device may send indication information associated with the network device, or may send indication information associated with another network device. A primary network device is a network device that is in network devices that provide a service for a same terminal and that sends indication information. In principle, any one or more network devices in a plurality of network devices cooperating to provide a service for a same terminal may serve as primary network devices. How to determine a primary network device is not limited in this application. For example, the N network devices may exchange information to determine one or more network devices that serve as primary network devices. For another example, a management device of the N network devices determines one or more network devices that serve as primary network devices and indicates the primary network devices to the N network devices. A non-primary network device in network devices cooperating to provide a service for a same terminal is a secondary network device. The management device is a device that manages the N network devices.

S102. The M primary network devices send the N pieces of indication information to the terminal, and the terminal receives the N pieces of indication information.

The indication information may be a new message, or an existing message may be reused. The technical solution in this embodiment may be applied to a scenario in which a PMI is fed back, or may be applied to a scenario in which no PMI is fed back. When this embodiment is applied to the scenario in which a PMI is fed back, a possible implementation is as follows: Codebook subset restriction indication information is reused for the indication information. It should be noted that this possible implementation may be not limited to being applied to the scenario in which a PMI is fed back. In principle, this possible implementation may be applied to any application scenario in which the codebook subset restriction indication information is used.

It should be noted that in a communications system, the terminal may determine a channel matrix based on a reference signal sent by a network device, determine a reference precoding matrix based on the channel matrix and a codebook, and then feed back related information of the reference precoding matrix to the network device in a PMI form. The network device obtains the reference precoding matrix, determines an actual precoding matrix based on the reference precoding matrix, precodes data based on the actual precoding matrix, and sends the precoded data to the terminal. The codebook is a set including a plurality of candidate matrices. A quantity of column vectors included in each candidate matrix is equal to a quantity of layers corresponding to the candidate matrix. For example, a candidate matrix corresponding to a quantity, namely, 2, of layers includes two column vectors. In a scenario in which the network device instructs the terminal to feed back a PMI, to reduce calculation complexity of the terminal, the network device may configure the codebook subset restriction indication information to indicate that one or more candidate matrices in a codebook are invalid candidate matrices. Then, the terminal selects a reference precoding matrix from valid candidate matrices of the codebook.

When the codebook subset restriction indication information is reused for the indication information, specifically, a maximum value of an RI that the network device allows the terminal to report may be explicitly or implicitly indicated in the codebook subset restriction indication information. For example, one or more bits in the codebook subset restriction indication information are used to indicate the maximum value of the RI that the network device allows the terminal to report (to be specific, explicit indication). For example, the codebook subset restriction indication information is configured based on a fact that the maximum value of the RI that the network device allows the terminal to report is considered (to be specific, implicit indication). For example, if the maximum value of the RI that the network device allows the terminal to report is 4, the codebook subset restriction indication information may indicate that a candidate matrix related to a quantity of layers that is greater than 4 is an invalid candidate matrix. In this example, based on an NCJT-based transmission mode, it may be considered that, when a network side uses the NCJT-based transmission mode for the terminal, a set that includes candidate matrices related to the quantity of layers that is greater than 4 is a restricted codebook subset.

A specific implementation of the codebook subset restriction indication information is as follows: In a codebook subset restriction technology, a network device may indicate an invalid candidate matrix in a codebook by setting some bits in a bit sequence to be invalid (for example, set to 0). Each bit in the bit sequence is used to indicate one or more candidate matrices in the codebook. Each bit in the bit sequence may be set to "0" or "1", to indicate whether all candidate matrices indicated by the bit are invalid candidate matrices or valid candidate matrices. Each bit is related to, for example, but not limited to, at least one of a quantity of layers, antenna configuration information, codebook information, and the like. In an LTE system, a bit sequence may be marked as $\alpha_{A_c-1}, \ldots, \alpha_3, \alpha_2, \alpha_1, \alpha_0$. Herein, $\alpha_{A_c-1}$ represents a most significant bit in the bit sequence, $\alpha_0$ represents a least significant bit in the bit sequence, and Ac is an integer greater than 0. For example, when a transport mode (TM) 9 or a TM 10 in LTE is configured, a quantity of antenna ports configured in a CSI process is 8, 12, 16, 20, 24, 28, or 32, and an eMIMO-Type is configured as a Class A, if a bit sequence used in the codebook subset restriction technology is $\alpha_{A_c-1}, \ldots, \alpha_3, \alpha_2, \alpha_1, \alpha_0$, last eight bits in the bit sequence are related to a quantity of layers, and $\alpha_i$ is related to a quantity i+1 of layers, where $0 \le i \le 7$, and i is an integer. In this example, assuming that a maximum value of an RI that a network device allows the terminal to report is 4, bits (namely, $\alpha_4, \alpha_5, \alpha_6, \alpha_7$) that are corresponding to quantities, namely, 5 to 8, of layers and that are in the last eight bits may be set to be invalid, to indicate that candidate matrices corresponding to the quantities, namely, 5 to 8, of layers are invalid candidate matrices.

S101 and S102 are implemented by using, for example, but not limited to, the following Manner 1 to Manner 3.

Manner 1: Each network device (including the primary network device and the secondary network device) in the N network devices generates indication information associated with the network device. Then, the secondary network device sends indication information associated with the secondary network device to the primary network device, and the M primary network devices send the N pieces of indication information to the terminal. Optionally, if M>1, any secondary network device may send indication information associated with the secondary network device to any primary network device.

Manner 2: Each network device generates indication information associated with the network device, and each network device sends the indication information related to the network device to the terminal. In this case, each network device may be considered as a primary network device.

Manner 3: The management device generates the N pieces of indication information, and the management device sends the N pieces of indication information to the M primary network devices. Then, the M primary network devices send the N pieces of indication information to the terminal. If M>1, the management device may send any one or more pieces of the N pieces of indication information to any primary network device, for example, but not limited to, send, to each network device, indication information associated with the network device. In this case, each network device may be considered as a primary network device.

In some embodiments of this application, the primary network device may add some or all of the N pieces of indication information to one message. For example, the N pieces of indication information are carried by using one message. For another example, the N pieces of indication information are carried by using N messages, where one piece of indication information is carried by using one message. The message may be, for example, but not limited to, radio resource control (RRC) signaling, media access control (MAC) signaling, or downlink control information (DCI).

In the LTE system, parameters related to an RI in RRC signaling mainly include pmi-RI-Report and ri-ConfigIndex. Herein, pmi-RI-Report is used by the terminal to determine whether to configure PMI or report an RI, and ri-ConfigIndex is used by the terminal to determine a time of reporting the RI. In some embodiments of this application, an example in which indication information is carried in RRC signaling and a maximum value, of an RI that a network device allows the terminal to report, that is indicated by the indication information is marked as ri-restriction is used. Herein, ri-restriction may be set before or after ri-ConfigIndex in the RRC signaling. For example, a format of an RRC information element (RRC IE) is as follows:

```
CQI-ReportPeriodic::= CHOICE{
    release           NULL,
    setup             SEQUENCE {
      cqi-PUCCH-Resource Index INTEGER{0...1185},
      cqi-pmi-ConfigIndex INTEGER{0...1023},
      cqi-FormatIndicatorPeriodic    CHOICE{
        widebandCQI              NULL,
        subbandCQI               SEQUENCE{
          k INTEGER(1...4)
        }
}
      ri-ConfigIndex INTEGER(0...1023) OPTIONAL, --Need OR,
      ri-restriction INTEGER(0...M)
simultaneousAckNackAndCQI        BOOLEAN
    }
}
```

The ri-restriction parameter is not required in some scenarios. Therefore, the parameter may be defined as OPTIONAL. In this case, a value range of the ri-restriction parameter may be INTEGER(1 . . . M). To be specific, when the parameter exists, ri-restriction takes effect. Otherwise, the maximum value of the RI reported by the terminal is not limited. In another definition method, the ri-restriction parameter is defined as necessary. In this case, a value range of the ri-restriction parameter may be INTEGER(0 . . . M). To be specific, when a value of the parameter is 0, it indicates that the maximum value of the RI reported by the terminal is not limited. In addition, a value range of the ri-restriction parameter may be defined as INTEGER(0 . . . M), and the ri-restriction parameter is defined as OPTIONAL. When the ri-restriction parameter does not exist, ri-restriction does not take effect. When a value of ri-restriction is 0, it indicates that a current ri-restriction parameter is the same as that in a latest configuration. Certainly, a method for defining the ri-restriction parameter and a value of the ri-restriction parameter are not limited thereto. M is a maximum value of ri-restriction. A specific value of ri-restriction is determined on a network side (including the network device and/or the management device). For a specific implementation, refer to the following description.

In some embodiments of this application, the RRC signaling carrying the indication information may be, for example, but not limited to, any one of the following: report setting information, reference signal setting information, measurement setting information, and connection relationship (link) information. It should be noted that the measurement setting information may include the report setting information and the reference signal setting information. That the indication information is carried in the measurement setting information in this application may be understood as that the indication information is carried in information other than the report setting information and the reference signal setting information in the measurement setting information. For example, but no limitation is imposed on the following description: a field that is in parallel with the report setting information and the reference signal setting information is set in the measurement setting information to carry the indication information. The connection relationship information is a relationship between the report setting information and the reference signal setting information. A reference signal may be used for both channel calculation and interference calculation. Therefore, for specific report setting information, the connection relationship is used to indicate a specific reference signal configured for channel calculation and a specific reference signal configured for interference calculation.

In some embodiments of this application, the indication information may be delivered in a periodic manner or in a non-periodic manner. If the indication information is delivered in a periodic manner, the N pieces of indication information in S101 to S103 are indication information delivered by the network devices in a measurement period, or indication information received by the terminal in a measurement period. Optionally, if the indication information is delivered in a periodic manner, the indication information may be carried in report setting information. Optionally, if the indication information is delivered in a non-periodic manner, the indication information may be carried in, for example, but not limited to, report setting information, reference signal setting information, or DCI.

In some embodiments of this application, a sum of maximum values of RIs that the N network devices allow the terminal to report is less than or equal to a maximum quantity of transmission layers that is supported by the terminal. This application imposes no limitation on how a primary network device determines a maximum value, of an RI that is allowed to be reported by the terminal, that is indicated by indication information sent by the primary network device. The network device (including the primary network device and the secondary network device) may exchange information to determine a quantity of network devices that cooperate to provide a service for the terminal. In an optional implementation, the network side (including the network device and/or the management device) may set, based on an even distribution rule, a maximum value of an RI that each network device allows the terminal to feed back. For example, assuming that a maximum quantity of transmission layers that is supported by the terminal is 8, and two network devices cooperate to provide a service for the terminal, a maximum value of an RI that each of the two network devices allows the terminal to feed back may be set to 4. In another optional implementation, the network side (including the network device and/or the management device) may also set, based on an uneven distribution rule, a maximum value of an RI that each network device allows the terminal to feed back. For example, assuming that a maximum quantity of transmission layers that is supported by the terminal is 8, two network devices (marked as a network device 1 and a network device 2 respectively) cooperate to provide a service for the terminal, and power of a sounding reference signal (SRS) received by the network device 1 is greater than power of an SRS received by the network device 2, it is considered that the network device 1 can schedule more layers in comparison with the network device 2. Therefore, a maximum value of an RI that the network device 1 allows the terminal to report is 5, and a maximum value of an RI that the network device 2 allows the terminal to report is 3. Certainly, this application is not limited thereto. It may be understood that network devices may obtain, through, for example, but not limited to, information exchange, power of an SRS received by a peer end. Alternatively, the management device may obtain, through, for example, but not limited to, reporting by a network device, power of an SRS received by the network device.

S103. The terminal reports RIs based on the N pieces of indication information.

In an example, the terminal does not know a specific network device from which specific indication information comes, and does not know an association relationship between specific indication information and a specific network device. The terminal may report an RI for indication information. Specifically, the terminal reports N RIs based on the N pieces of indication information, where one RI is reported for each piece of indication information. To be specific, a value of each RI reported by the terminal is associated with one piece of the N pieces of indication information, and the value of each RI does not exceed a maximum value, of an RI that a network device allows the terminal to report, that is indicated by the indication information related to the RI. Optionally, each of the N RIs reported by the terminal may be carried in one message for transmission, or a plurality of any RIs in the N RIs may be carried in one message for transmission. The message may be uplink control information (UCI). Certainly, the message may further be other information, for example, but not limited to, information carried on a physical uplink shared channel (PUSCH). This is not limited in this application. In addition, optionally, the terminal may report the N RIs to any one or more network devices that cooperate to provide a service for the terminal.

For example, the terminal may determine, based on at least one of the following parameters, an optional range of an RI associated with each piece of indication information: a quantity of CSI-RS ports in reference signal setting information, a downlink and uplink multiple-input multiple-output (MIMO) capability of the terminal in the bandwidth, a codebook set, and ri-restriction. The CSI-RS may be a beamformed CSI-RS, or may be a non-precoding (NP) CSI-RS.

It should be noted that in an existing system, if a network device configures maxLayersMIMO-r10 for the terminal, the terminal determines an optional range of an RI, namely, a maximum optional value of a reported value for the RI, based on maxLayersMIMO-r10. Herein, maxLayersMIMO-r10 indicates a maximum capability (or a maximum value) of a quantity of MIMO layers supported by the network device. In this application, after the network device configures ri-restriction for the terminal, the maximum optional value of the RI reported by the terminal may be a smaller value between maxLayersMIMO-r10 and ri-restriction, to be specific, the maximum optional value of the RI=min{maxLayersMIMO-r10, ri-restriction}. In other words, a value range of the RI reported by the terminal is 0<RI≤a maximum optional value of the RI. Similarly, in another configuration scenario, a value of ri-restriction may be added to the maximum optional value of the original reported value of the RI for limitation.

In this embodiment, the network side indicates, to the terminal by using signaling, maximum values of RIs that network devices cooperating to provide a service for the terminal allow the terminal to report, to help implement a case in which a sum of the RIs that the network devices cooperating to provide the service for the terminal allow the terminal to report is less than or equal to the maximum quantity of transmission layers that is supported by the terminal. This helps ensure that when the network devices cooperating to provide the service for the terminal simultaneously schedule the terminal, a total quantity of scheduled layers does not exceed a decoding capability of the terminal.

Figure 3:
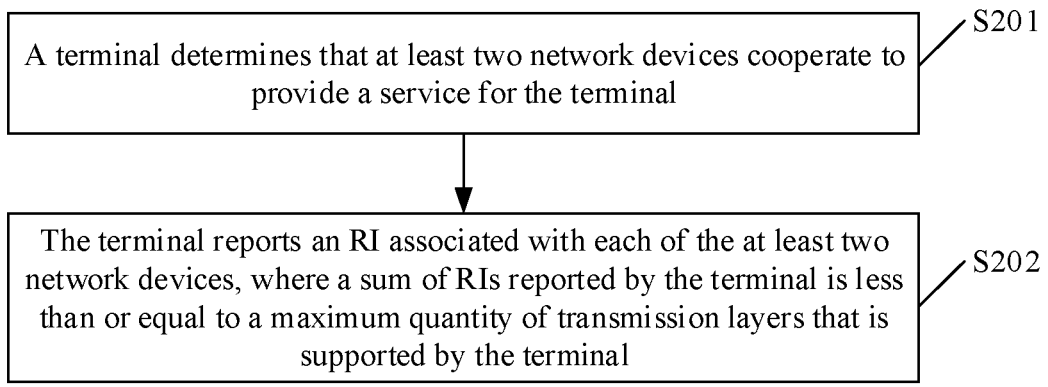
FIG. 3 is a schematic diagram of an RI reporting method according to an embodiment of this application.

FIG. 3 is a schematic diagram of another RI reporting method according to an embodiment of this application. Details are as follows.

S201. A terminal determines that at least two network devices cooperate to provide a service for the terminal.

In some embodiments of this application, if the terminal determines that a maximum quantity of pieces of DCI pointing to the terminal within a preset time period is N, it is determined that a maximum of N network devices cooperate to provide a service for the terminal, where N is an integer greater than or equal to 2. For example, in a discussion on coordinated multipoint in 5G new radio (NR), a solution in which one or more network devices send a plurality of pieces of DCI to one terminal is supported. Specifically, a network device may send a parameter max_DCI_NUM to the terminal by using layer 2 signaling (for example, RRC signaling) or layer 3 signaling (for example, MAC signaling), or implicitly indicate max_DCI_NUM by using another parameter, where the parameter max_DCI_NUM is used to indicate a maximum quantity of pieces of DCI pointing to the terminal within a preset time period. In this embodiment, the terminal may determine, based on the parameter max_DCI_NUM, that a maximum quantity of network devices cooperating to provide a service for the terminal is max_DCI_NUM. The parameter max_DCI_NUM may be used as N in this embodiment.

Optionally, if the terminal determines that a quantity of pieces of DCI pointing to the terminal within a preset time period is N, it is determined that N network devices cooperate to provide a service for the terminal, where N is an integer greater than or equal to 2. For example, in a discussion on coordinated multipoint in 5G new radio, a solution in which a network device sends a plurality of pieces of DCI to the terminal is supported. Specifically, a network device may send a parameter to the terminal by using layer 2 signaling or layer 3 signaling, to indicate a quantity of pieces of DCI. In this embodiment, the terminal may use the parameter as a quantity of network devices that provide a service. The quantity of pieces of DCI is N in this embodiment.

In some other embodiments of this application, when determining that the terminal is jointly served by a plurality of network devices through NCJT, the terminal may determine a quantity of network devices that cooperate to provide a service for the terminal. For example, but no limitation is imposed on the following description: when a same non-zero power (NZP) CSI-RS setting in measurement setting information received by the terminal is used for both channel calculation and interference calculation, it may be considered that the terminal is served by a plurality of network devices through NCJT. Alternatively, the terminal receives a hypothesis indicator sent by a network device, where the hypothesis indicator is used to indicate a transmission mode, and the transmission mode is, for example, but not limited to, dynamic point selection (DPS) or NCJT. Therefore, the terminal may determine, based on the hypothesis indicator, whether the terminal is served by a plurality of network devices through NCJT.

The terminal may preset (for example, but not limited to, preset by using a protocol) a quantity of network devices that cooperate to provide a service for the terminal through NCJT. The terminal may further determine, based on a plurality of different NZP CSI-RS settings in the measurement setting information, a quantity of network devices that provide a service for the terminal. For example, assuming that there are two pieces of measurement setting information, where Non-QCL is applied to a port in an NZP CSI-RS setting used for channel calculation in one piece of measurement setting information and a port in an NZP CSI-RS setting used for channel calculation in the other piece of measurement setting information, the terminal may determine that two network devices serve the terminal, where QCL is an abbreviation for quasi co-location.

S202. The terminal reports an RI associated with each of the at least two network devices, where a sum of RIs reported by the terminal is less than or equal to a maximum quantity of transmission layers that is supported by the terminal.

Each network device is associated with one RI. If the terminal determines that a total of N network devices cooperate to provide a service for the terminal, each of N RIs reported by the terminal may be carried in one message for transmission, or a plurality of any RIs in the N RIs may be carried in one message for transmission. The message may be UCI, and certainly may be other information. This is not limited in this application. Optionally, the terminal may report the N RIs to any one or more network devices that cooperate to provide a service for the terminal. For example, the terminal reports an RI associated with each network device to the network device. For another example, the terminal reports the N RIs to a primary network device.

In this embodiment, when the terminal determines that the at least two network devices cooperate to provide the service for the terminal, the sum of the RIs reported to the at least two network devices is less than or equal to the maximum quantity of transmission layers that is supported by the terminal. This helps ensure that when the at least two network devices simultaneously schedule the terminal, a total quantity of scheduled layers does not exceed a decoding capability of the terminal.

As described above, in a 5G communications system, network devices cannot perform real-time interaction due to non-ideal backhaul. Therefore, in some implementations of this application, the plurality of network devices that are described above and that cooperate to provide a service for the terminal are network devices that cannot interact with each other in real time. A reason lies in that network devices supporting real-time interaction may learn of a current quantity of scheduled layers for the terminal through real-time interaction. In this way, a case in which a total quantity of layers scheduled by a plurality of network devices is greater than a maximum quantity of transmission layers that is supported by the terminal can be avoided. Certainly, this application is not limited thereto. For example, if network devices supporting real-time interaction do not perform real-time interaction, a total quantity of layers scheduled by a plurality of network devices may be greater than the maximum quantity of transmission layers that is supported by the terminal. In this case, the plurality of network devices that are described above and that cooperate to provide a service for the terminal may be network devices that cannot interact with each other in real time, or may be network devices that can interact with each other in real time.

Figure 3A:
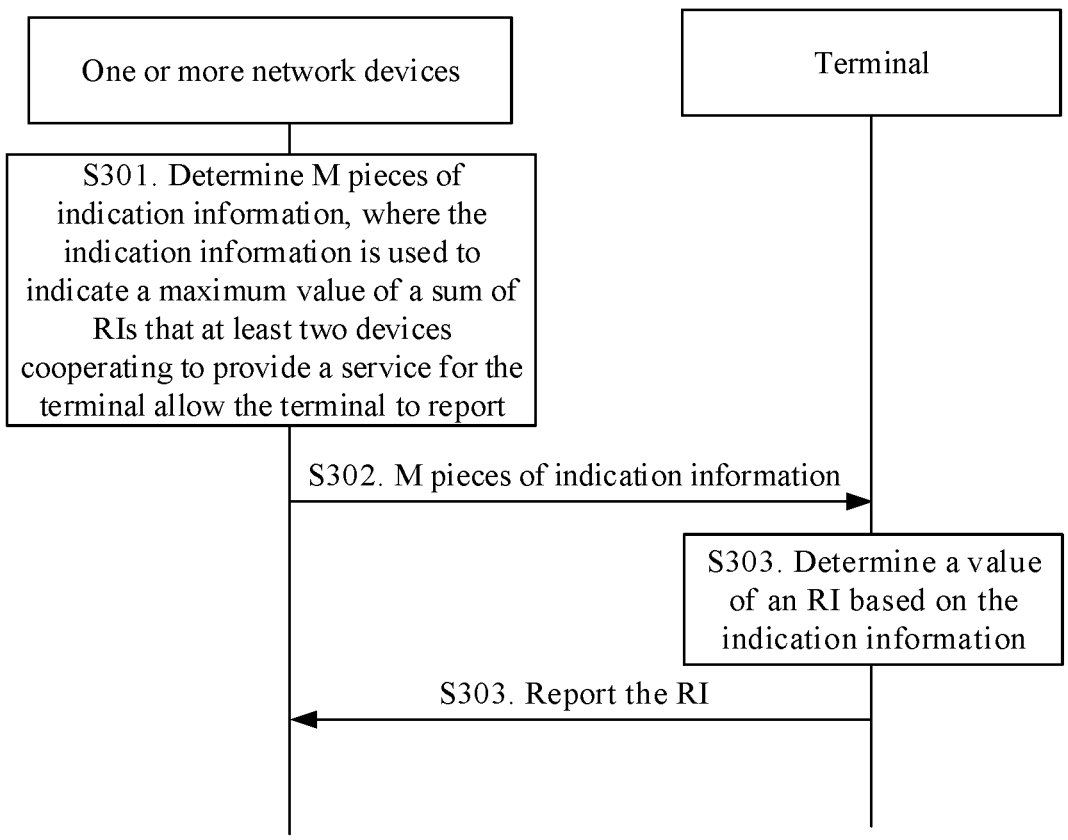
FIG. 3a is a schematic diagram of another indication method and another RI reporting method according to an embodiment of this application.

FIG. 3a is a schematic diagram of an indication method and an RI reporting method according to this application. The method is applicable to a scenario in which N network devices cooperate to provide a service for a same terminal, where N is an integer greater than or equal to 2. Details are as follows.

S301. M primary network devices in the N network devices determine M pieces of indication information, where 1≤M≤N, and M is an integer. If M>1, each primary network device determines same indication information. The indication information is used to indicate a maximum value of a sum of RIs that at least two devices cooperating to provide a service for a terminal allow the terminal to report.

For related descriptions of the primary network device, refer to the previous description. Details are not described herein again. The maximum value of the sum of the RIs that the at least two network devices allow the terminal to report is less than or equal to a maximum quantity of transmission layers that is supported by the terminal. For related descriptions of the maximum quantity of transmission layers that is supported by the terminal, refer to the previous description. Details are not described herein again.

S302. The M primary network devices send the M pieces of indication information to the terminal, and the terminal receives the M pieces of indication information.

Optionally, any one of the M primary network devices may add the indication information to a new message or an existing message. The message may be, for example, but not limited to, RRC signaling, MAC signaling, or DCI. For example, the message may be, for example, but not limited to, any one of the following: report setting information, reference signal setting information, measurement setting information, and connection relationship information.

S303. The terminal determines a value of an RI based on the indication information, and reports the determined value.

In an example, the terminal does not know a specific network device from which the indication information comes. In a specific implementation, as described above, the terminal may report an RI to a network device based on measurement setting information. In this example, before the terminal reports the RI, in a process determining the value of the RI, the terminal needs to limit a sum of RIs reported by the terminal within a maximum value, of a sum of RIs that are allowed to be reported by the terminal, that is indicated by the indication information. In other words, the sum of the RIs reported by the terminal needs to be less than or equal to the maximum value, of the sum of the RIs that are allowed to be reported by the terminal, that is indicated by the indication information.

In an NR system, the terminal may receive one or more pieces of measurement setting information sent on a network side, and each piece of measurement setting information may be used to configure one or more RS (for example, CSI-RS) resource sets or RS resources associated with one or more network devices that cooperate to provide a service for the terminal. For each RS resource set or RS resource, the terminal needs to report an RI. In other words, for each piece of measurement setting information, the terminal needs to report one or more RIs. If a plurality of RIs are reported, the plurality of RIs may be simultaneously reported, or may be reported at different times.

For example, if network devices cooperating to provide a service for the terminal jointly send one piece of measurement setting information to the terminal, when receiving the indication information, the terminal may limit a sum of RIs reported for the measurement setting information within a maximum value, of a sum of RIs that are allowed to be reported by the terminal, that is indicated by the indication information.

For another example, if network devices cooperating to provide a service for the terminal jointly send a plurality of pieces of measurement setting information to the terminal, it is necessary to indicate, in an explicit or implicit manner, specific pieces of measurement setting information that are associated. A specific indication manner is not limited in this application. Therefore, when receiving the indication information, the terminal may limit a sum of RIs reported for the specific pieces of measurement setting information within a maximum value, of a sum of RIs that are allowed to be reported by the terminal, that is indicated by the indication information.

In this embodiment, the network side indicates, to the terminal by using signaling, a maximum value of a sum of RIs that network devices cooperating to provide a service for the terminal allow the terminal to report, to help implement a case in which the sum of the RIs that the network devices cooperating to provide the service for the terminal allow the terminal to report is less than or equal to the maximum quantity of transmission layers that is supported by the terminal. This helps ensure that when the network devices cooperating to provide the service for the terminal simultaneously schedule the terminal, a total quantity of scheduled layers does not exceed a decoding capability of the terminal.

The solutions provided in the embodiments of this application are mainly described above from the perspective of interaction between network elements. It may be understood that each network element is, for example, a network device or a terminal. To implement the foregoing functions, the network element includes hardware structures and/or software modules corresponding to the functions. Persons skilled in the art should easily be aware that, in combination with the examples described in the embodiments disclosed in this specification, units and algorithms steps may be implemented by hardware or a combination of hardware and computer software in this application. Whether a function is performed by hardware or computer software driving hardware depends on particular applications and design constraints of the technical solutions. Persons skilled in the art may use different methods to implement the described functions for each particular application, but it should not be considered that the implementation goes beyond the scope of this application.

In the embodiments of this application, function modules of the network device or the terminal may be divided based on the foregoing method examples. For example, the function modules may be divided based on corresponding functions, or two or more functions may be integrated into one processing module. The integrated module may be implemented in a form of hardware, or may be implemented in a form of a software function module. It should be noted that the module division in the embodiments of this application is an example, and is merely logical function division. There may be another division manner in actual implementation. Descriptions are provided below by using an example in which the function modules are divided based on corresponding functions.

Figure 4:
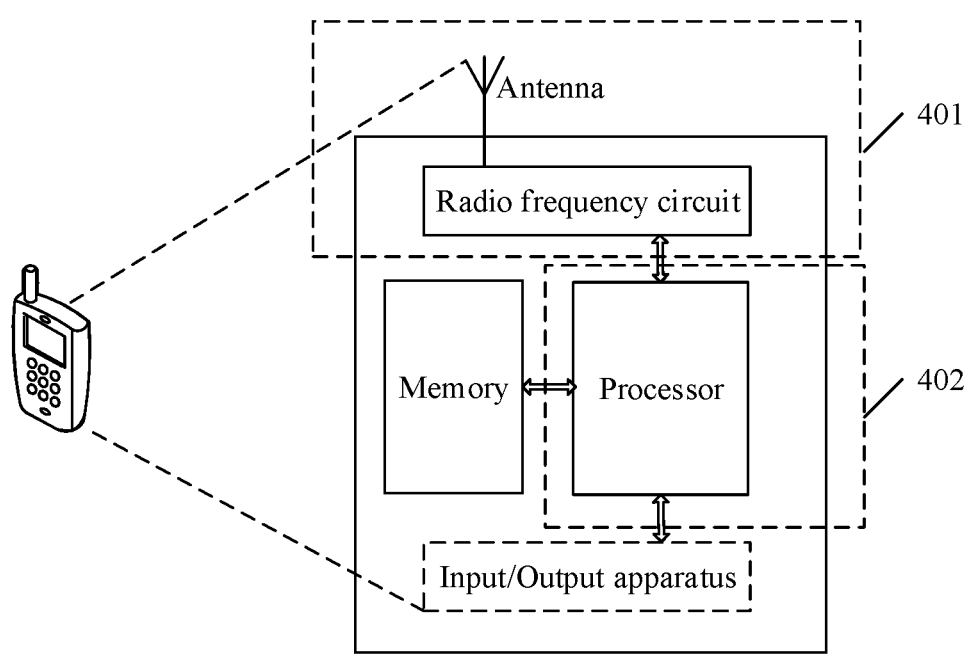
FIG. 4 is a simplified schematic structural diagram of a terminal according to an embodiment of this application.

An embodiment of this application further provides a terminal. The terminal may be configured to perform steps performed by the terminal in FIG. 2, FIG. 3, or FIG. 3a. FIG. 4 is a simplified schematic structural diagram of a terminal. For ease of understanding and convenience of figure illustration, an example in which the terminal is a mobile phone is used in FIG. 4. As shown in FIG. 4, the terminal includes a processor, a memory, a radio frequency circuit, an antenna, and an input/output apparatus. The processor is mainly configured to: process a communications protocol and communication data, control the terminal, execute a software program, process data of the software program, and the like. The memory is mainly configured to store a software program and data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus such as a touchscreen, a display screen, or a keyboard is mainly configured to: receive data entered by a user, and output data to the user. It should be noted that terminals of some types may not have the input/output apparatus.

When the processor needs to send data, after performing baseband processing on to-be-sent data, the processor outputs a baseband signal to the radio frequency circuit. After performing radio frequency processing on the baseband signal, the radio frequency circuit sends a radio frequency signal in an electromagnetic wave form to the outside by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 4 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna that has receiving and transmitting functions and the radio frequency circuit may be considered as a transceiver unit of the terminal, and the processor that has a processing function may be considered as a processing unit of the terminal. As shown in FIG. 4, the terminal includes a transceiver unit 401 and a processing unit 402. The transceiver unit may also be referred to as a transceiver, a transceiver apparatus, or the like. The processing unit may also be referred to as a processor, a processing board, a processing module, a processing apparatus, or the like. Optionally, a component for implementing a receiving function in the transceiver unit 401 may be considered as a receiving unit, and a component for implementing a sending function in the transceiver unit 401 may be considered as a sending unit. In other words, the transceiver unit 401 includes the receiving unit and the sending unit. The transceiver unit sometimes may also be referred to as a transceiver, a transceiver, a transceiver circuit, or the like. The receiving unit sometimes may also be referred to as a receiver, a receiver circuit, or the like. The sending unit sometimes may also be referred to as a transmitter, a transmitter, a transmitter circuit, or the like.

For example, in an implementation, the transceiver unit 401 is configured to perform steps performed by the terminal in S102 and/or S103 in FIG. 2, and/or other steps in this application. The processing unit 402 is configured to perform related steps in this application. For another example, in an implementation, the transceiver unit 401 is configured to perform S201 in FIG. 3, and/or other steps in this application. The transceiver unit 401 is configured to perform S202 in FIG. 3, and/or other steps in this application. For still another example, in an implementation, the transceiver unit 401 is configured to perform receiving and sending steps performed by the terminal in S302 and S303 in FIG. 3a, and/or other steps in this application. The processing unit 402 is configured to perform the step of determining a value of an RI in S303 in FIG. 3a, and/or other steps in this application.

Figure 5:
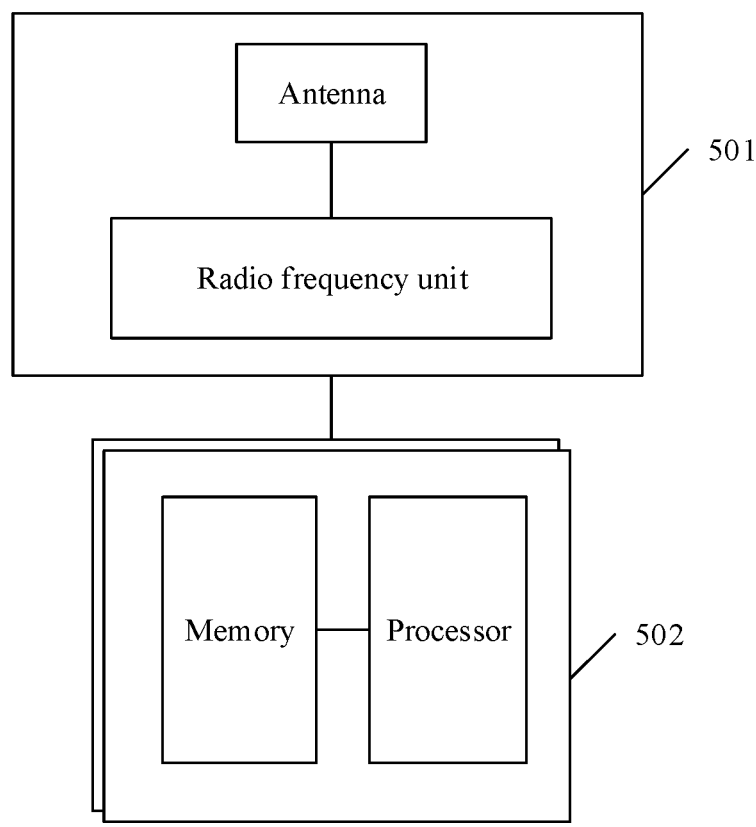
FIG. 5 is a simplified schematic structural diagram of a base station network device according to an embodiment of this application.

An embodiment of this application further provides a network device, for example, a base station network device. FIG. 5 is a simplified schematic structural diagram of a base station network device. The base station network device includes a part 501 and a part 502. The part 501 is mainly configured to receive and send a radio frequency signal and perform conversion between a radio frequency signal and a baseband signal. The part 502 is mainly configured to perform baseband processing, control the base station network device, and the like. The part 501 may be usually referred to as a transceiver unit, a transceiver, a transceiver circuit, a transceiver, or the like. The part 502 is usually a control center of the base station network device, or may be usually referred to as a processing unit, configured to control the base station network device to perform steps performed by the base station network device (namely, serving base station network device) in FIG. 5. For details, refer to the foregoing descriptions of the related part.

A transceiver unit of the part 501 may also be referred to as a transceiver, a transceiver, or the like, and includes an antenna and a radio frequency unit. The radio frequency unit is mainly configured to perform radio frequency processing. Optionally, in the part 501, a component configured to implement a receiving function may be considered as a receiving unit, and a component configured to implement a sending function may be considered as a sending unit. In other words, the part 501 includes the receiving unit and the sending unit. The receiving unit may also be referred to as a receiver, a receiver, a receiver circuit, or the like. The sending unit may also be referred to as a transmitter, a transmitter, a transmitter circuit, or the like.

The part 502 may include one or more boards. Each board may include one or more processors and one or more memories. The processor is configured to read and execute a program in the memory, to implement a baseband processing function and control the base station. If there are a plurality of boards, the boards may be interconnected to increase a processing capability. In an optional implementation, alternatively, a plurality of boards may share one or more processors, or a plurality of boards share one or more memories, or a plurality of boards share one or more processors at the same time.

For example, in an implementation, the processing unit is configured to perform S201 in FIG. 2, and/or other steps in this application. The transceiver unit is configured to perform steps performed by the network device in S102 and/or S103 in FIG. 2, and/or other steps in this application. For another example, in an implementation, the processing unit is configured to perform S301 in FIG. 3a, and/or other steps in this application. The transceiver unit is configured to perform steps performed by the network device in S302 and/or S303 in FIG. 3a, and/or other steps in this application.

For explanations and beneficial effects of related content in any communications apparatus provided above, refer to corresponding method embodiments provided above. Details are not described herein again.

All or some of the foregoing embodiments may be implemented by using software, hardware, firmware, or any combination thereof. When a software program is used to implement the embodiments, the embodiments may be all or partially implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations, or equivalents that cover the scope of this application. Obviously, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A rank indication (RI) reporting method, wherein the method comprises:
receiving at least two pieces of indication information, wherein each indication information of the at least two pieces of indication information reuses codebook subset restriction indication information to indicate a maximum value of an RI that a network device associated with the indication information allows a terminal to report, the codebook subset restriction indication information comprises a bit sequence, each bit in the bit sequence corresponds to one or more candidate matrices in a codebook, the codebook subset restriction indication information indicates, a candidate matrix as an invalid candidate matrix by setting a corresponding bit in the bit sequence to be invalid, the candidate matrix corresponds to a quantity of layers that is greater than the maximum value of the RI that the network device associated with the indication information allows the terminal to report, and the network device is one of at least two network devices associated with the at least two pieces of indication information cooperate to provide a service for the terminal; and
reporting RIs based on the at least two pieces of indication information.

2. The method according to claim 1, wherein a sum of maximum values of RIs that the at least two network devices allow the terminal to report is less than or equal to a maximum quantity of transmission layers that are supported by the terminal.

3. The method according to claim 1, wherein each of the at least two pieces of indication information is carried in one or more of: report setting information, reference signal setting information, measurement setting information, or connection relationship information.

4. The method according to claim 1, wherein the at least two pieces of indication information are received within a same measurement period.

5. The method according to claim 1, wherein
the at least two pieces of indication information come from a same network device in the at least two network devices; or
each of the at least two pieces of indication information comes from a respective network device associated with the indication information.

6. A rank indication (RI) reporting apparatus, wherein the apparatus comprises:

a transceiver, configured to receive at least two pieces of indication information, wherein each indication information of the at least two pieces of indication information reuses codebook subset restriction indication information to indicate a maximum value of an RI that a network device associated with the indication information allows a terminal to report, the codebook subset restriction indication information comprises a bit sequence, each bit in the bit sequence corresponds to one or more candidate matrices in a codebook, the codebook subset restriction indication information indicates, a candidate matrix as an invalid candidate matrix by setting a corresponding bit in the bit sequence to be invalid, the candidate matrix corresponds to a quantity of layers that is greater than the maximum value of the RI that the network device associated with the indication information allows the terminal to report, and at least two network devices associated with the at least two pieces of indication information cooperate to provide a service for the terminal, wherein the transceiver is further configured to report RIs based on the at least two pieces of indication information.

7. The apparatus according to claim 6, wherein a sum of maximum values of RIs that the at least two network devices allow the terminal to report is less than or equal to a maximum quantity of transmission layers that are supported by the terminal.

8. The apparatus according to claim 6, wherein each of the at least two pieces of indication information is carried in one or more of report setting information, reference signal setting information, measurement setting information, or connection relationship information.

9. The apparatus according to claim 6, wherein the at least two pieces of indication information are received within a same measurement period.

10. The apparatus according to claim 6, wherein
the at least two pieces of indication information come from a same network device in the at least two network devices; or
each of the at least two pieces of indication information comes from a respective network device associated with the indication information.

11. An indication method, wherein the method comprises:
generating at least two pieces of indication information, wherein each indication information of the at least two pieces of indication information reuses codebook subset restriction indication information to indicate a maximum value of an RI that a network device associated with the indication information allows a terminal to report, the codebook subset restriction indication information comprises a bit sequence, each bit in the bit sequence corresponds to one or more candidate matrices in a codebook, the codebook subset restriction indication information indicates, a candidate matrix as an invalid candidate matrix by setting a corresponding bit in the bit sequence to be invalid, the candidate matrix corresponds to a quantity of layers that is greater than the maximum value of the RI that the network device associated with the indication information allows the terminal to report, and the network device is one of at least two network devices associated with the at least two pieces of indication information cooperate to provide a service for the terminal; and sending the at least two pieces of indication information.

12. The method according to claim 11, wherein a sum of maximum values of RIs that the at least two network devices allow the terminal to report is less than or equal to a maximum quantity of transmission layers that are supported by the terminal.

13. The method according to claim 11, wherein each of the at least two pieces of indication information is carried in one or more of report setting information, reference signal setting information, measurement setting information, or connection relationship information.

* * * * *

UNITED STATES PATENT AND TRADEMARK OFFICE
CERTIFICATE OF CORRECTION

PATENT NO. : 11,101,866 B2
APPLICATION NO. : 16/694405
DATED : August 24, 2021
INVENTOR(S) : Hang et al.

Page 1 of 1

It is certified that error appears in the above-identified patent and that said Letters Patent is hereby corrected as shown below:

On the Title Page

Column 2 (item (56) other Publications) Line 1 delete "V143.0" and insert -- V14.3.0 --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*